Figure 1:
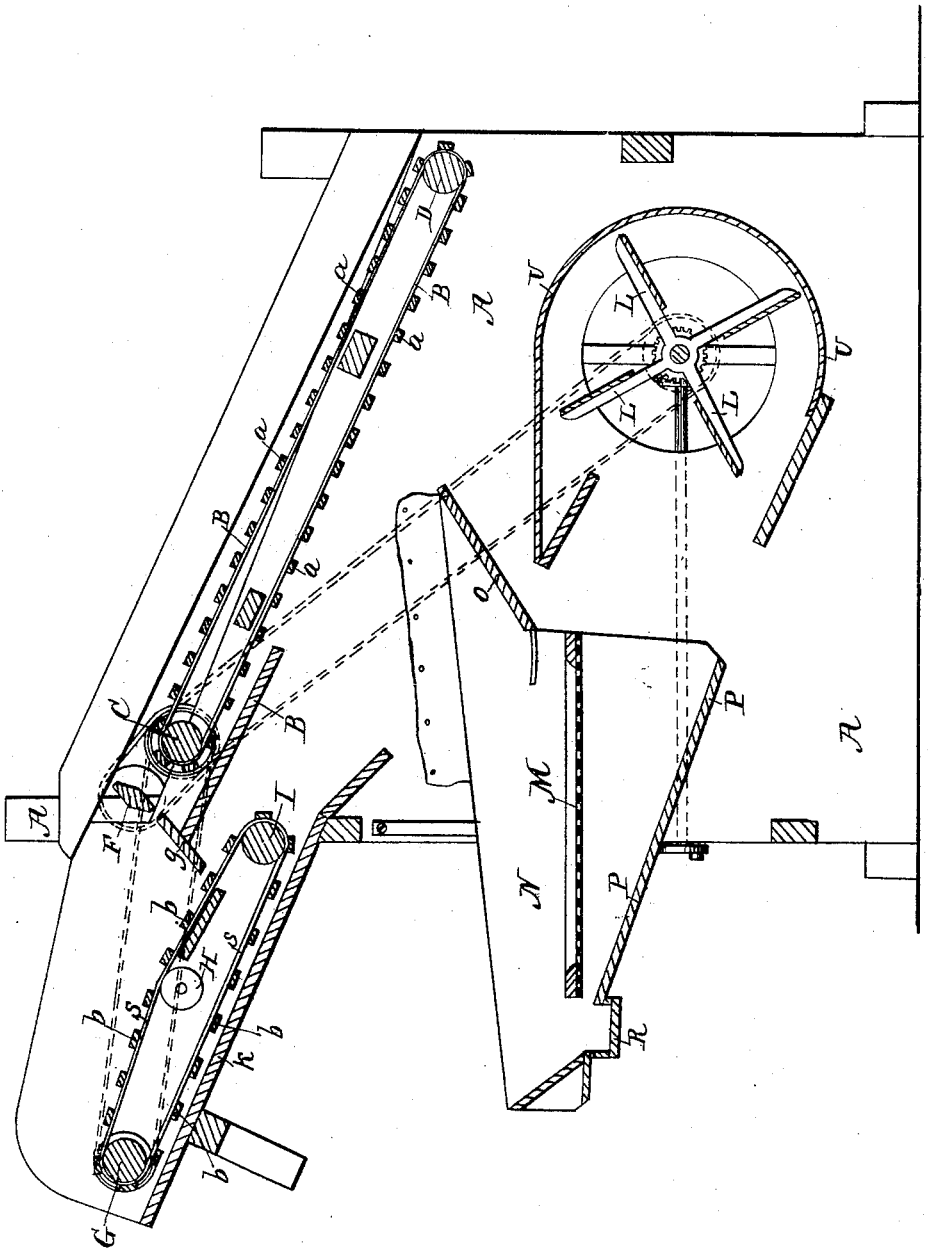

A. GAAR.
Grain Separator.

No. 27,497.

Patented March 13, 1860.

Witnesses.
E. Cohen
J. Hirsch.

Inventor.
Abram Gaar
per A.B. Stoughton
his attorney

UNITED STATES PATENT OFFICE.

ABRAM GAAR, OF RICHMOND, INDIANA, ASSIGNOR TO HIMSELF, JOHN M. GAAR, AND WM. G. SCOTT, OF SAME PLACE.

GRAIN-CLEANER.

Specification of Letters Patent No. 27,497, dated March 13, 1860.

*To all whom it may concern:*

Be it known that I, ABRAM GAAR, of Richmond, in the county of Wayne, and State of Indiana, have invented certain new and useful Improvements in Machines for Cleaning and Separating Grain; and I do hereby declare that the following is a full, clear, and exact description of the construction and operation of the same, reference being had to the accompanying drawing, which represents a longitudinal vertical section through said machine.

The object of my invention is to effect a separate and independent discharge of the grain and chaff from the grain carrier as well as from the straw carrier to the fanning mill of a grain separator, thereby producing a more uniform and continuous discharge of the grain than in the machines used heretofore, wherein all the grain and chaff are discharged to the fanning mill over one common board, or through a common passage.

To enable others skilled in the art to make and use my invention, I will proceed to describe its construction and operation.

A, represents the frame of the machine.

B, represents the common grain carrier; it consists of an endless belt or cloth which passes around and is operated upon by the rollers C, and D, and to which belt, the strips, cells or lags a, are secured; the grain and straw is delivered on to this grain carrier as it comes from the threshing machine.

E, represents an inclined board, which is secured underneath the upper end of the grain carrier, and on which the grain drops when discharged by the grain carrier, and from whence it is delivered to the action of the fanning mill.

F, represents a revolving shaker which throws the straw from the grain carrier down to the straw carrier; the latter consists of an endless belt S, which passes around the pulleys G, H, and I, and to which the slats or logs b, are secured, the grain and chaff, which is contained in the straw drops through between the slats b, of the straw carrier, while the straw is carried up toward the remote end thereof.

K, represents an inclined board or bottom which is secured below the straw carrier, and on which the grain falls which is discharged from the straw on the straw carrier, whence it slides down the inclined board toward and within the influence of the blast of the fanning mill.

L, represents the fan for separating the chaff from the grain; it is of the usual construction, and is inclosed within a circular fan case U, whence the blast is forced toward the screen M. The screen M, is secured within the screen box N, which is vibrated in the usual manner by a shaker.

The operation of the entire apparatus is as follows: The grain and straw as it comes from the threshing machine is delivered on the cell carrier or carrying belt B, and carried upward, the grain settling within the cells formed by the lags, and dropping together with the chaff on the inclined board E, whence it descends down to the board O, of the screen box N, and thence to the screen M. The straw is operated upon by the revolving shaker F, which not only loosens it but also pitches it down over the board g, to the straw carrier S; the action of this shaker F in connection with the fall of the straw from the grain carrier to the straw carrier greatly facilitates the entire operation, chiefly when the grain is damp, and the grain and chaff remaining in the straw drop through between the slats b, and to the board K, and slides down to the screen M, without coming previously in contact with any grain which is discharged from the grain carrier B.

In the machines heretofore used, the grain is discharged by the grain carrier, and the straw carrier at one point, they being on a line with each other, or nearly so, the grain carrier discharging in the direction of its motion, and the straw carrier in a direction toward the latter, thereby frequently crowding the grain into a narrow space and preventing the regular and continuous discharge which is essential to the proper working, while in my arrangement the two carriers discharge entirely independent of each other. The grain descending separately from the boards K, and E, passes through the screen M, down to the board P, and the chaff and light grain are blown out by the blast of the fan blower, while the heavy grain passes down the board P, into the receiving box. The lighter grain is collected in the spout R, which is of the usual construction.

Having thus fully described the nature of my invention, what I claim as new in the construction of grain separators and desire to secure by Letters Patent, is—

1. Separating the grain, chaff and straw by providing the grain carrier as well as the straw carrier with separate boards E, K, on which the grain is collected, and from which it is discharged separately to the fanning mill, substantially in the manner, and for the purpose herein described.

2. I also claim arranging the upper line of the open straw carrier below and under the lower line of the cell carrier when combined with a shaker F and with the separating boards E $g$ K, so as to produce a fall between the two carriers for the purpose of facilitating the separating of the grain from the straw as described.

ABRAM GAAR.

Witnesses:
FIELDING GAAR,
JOHN FINLEY.